Feb. 27, 1940.   N. WALKER   2,191,636
RADIATOR OVERFLOW VALVE
Filed May 5, 1938
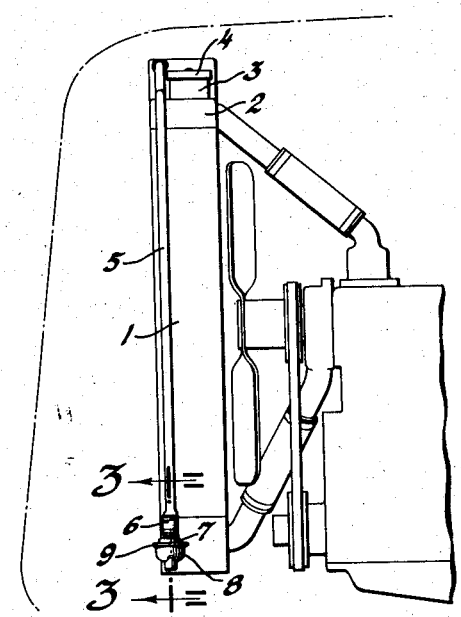
Fig.1
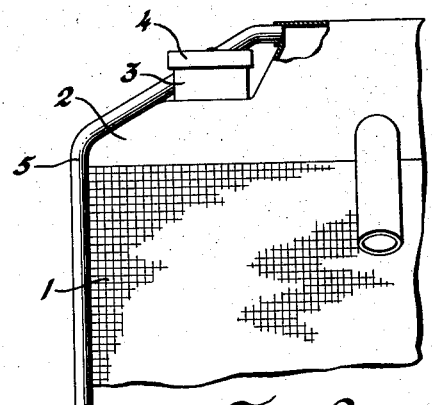
Fig.2
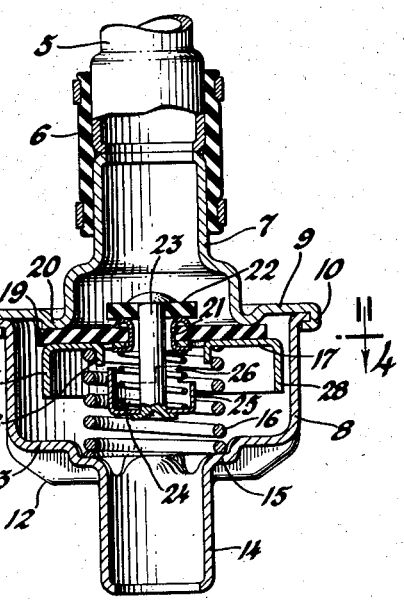
Fig.3
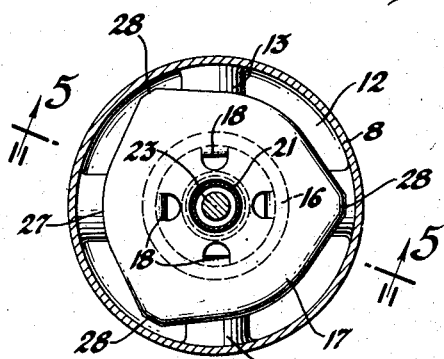
Fig.4
Fig.5
Inventor
Nelson Walker
By
Blackmore, Spencer & Hind
Attorneys Patented Feb. 27, 1940

2,191,636

UNITED STATES PATENT OFFICE 2,191,636

RADIATOR OVERFLOW VALVE

Nelson Walker, Flint, Mich., assignor to General Motors Corporation, Detroit, Mich., a corporation of Delaware Application May 5, 1938, Serial No. 206,235

1 Claim. (Cl. 277—61)

This invention relates to an improvement in radiator overflow valves and the structure is intended for application either as original or accessory equipment, to the usual overflow vent pipe of an engine cooling system. It will enable the use of more of the available space at the top of the customary automobile radiator shell for housing the upper or inlet tank of the radiator assembly and thereby increase tank capacity. This is for the reason that pressure valves now in general use are made as a part of the spout closure cap and necessitate a deep spout from which the overflow pipe leads and the bottom of the spout determines the height of the top tank. Because of the limitation of space and the need for a large tank the disadvantages of a spout enclosed pressure valve may outweigh its advantages and accordingly it is an object of the present invention to provide for the use of a large top tank with a relatively short filler spout and a flat closure cap with the overflow leading from the topmost portion of the tank and being provided at its discharge end with a pressure valve assembly.

Another object of the invention is to provide a low cost unit made from a few easily manufactured parts so related to one another as to insure positive and carefree operation over a long period of time and which may be applied readily to existing cooling systems for their conversion for pressure operation.

A further object of the invention is to provide a valve housing formed of a pair of pressed metal parts joined together to enclose the valve mechanism and wherein one part has a pressed rib affording an effective valve seat and the other part has pressed formations affording raised locating and centering seats for the endmost coil of a valve spring and depressed drain troughs for by-passing the coil spring for the escape of pressure fluid in the event the spring coils close together under the action of internal pressure unseating the valve. To locate and center the opposite end of the valve spring which bears against a backing plate for the sealing gasket constituting the main valve, the backing plate is provided with struck out tongues at circumferentially spaced points for a nested fit with the endmost coil.

A still further object of the invention is to provide a spring seated vacuum relief valve whose stem carries a spring retainer arranged to limit contraction of the spring and thereby prevent closing of the coils and interference to the flow of vacuum relieving fluid.

Additional objects and advantages of the construction will be apparent from the accompanying drawing wherein Figure 1 is a side elevation showing a portion of an engine and its air cooled radiator in the cooling system; Figure 2 shows the upper portion of a more or less conventional type of radiator; Figure 3 is a vertical sectional view of the improved pressure valve and is taken on line 3—3 of Figure 1; Figure 4 is a horizontal sectional view taken on line 4—4 of Figure 3 and Figure 5 is a detail section taken as on line 5—5 of Figure 4.

Referring to the drawing, the numeral 1 indicates the radiator core forming a part of the circulating cooling system having the inlet tank 2 at its upper end which is provided with a filler spout 3 closed by a removable cap 4. From the uppermost portion of the tank leads an overflow or vent pipe 5 extending down the side of the radiator according to usual practice. To the lower end of the pipe 5 may be connected by a suitable coupling hose 6 the tubular end or inlet 7 of the valve mechanism which controls the overflow.

The valve mechanism is enclosed within a housing comprising the casing 8 and the cover 9 secured together by flanging or peening the adjacent ends together as at 10. These parts, as well as the valve parts, may be stamped from brass or other metal which resists corrosion. The casing 8 is a cupped pressing having in the base thereof the alternately arranged depressions or troughs 12 and ribs 13. The bottom wall of the stamping 8 also has a central opening formed by the tubular extension 14 and into which the depressed troughs 12 enter. For some installations the extension 14 can be omitted and discharge openings provided in the wall of the casing 8 but for uniformity of product it will be better to construct the parts as shown, inasmuch as it may be desirable under certain conditions to install the valve unit intermediate the ends of the overflow pipe 5, as for example, near the upper end of the pipe in which case a section of the pipe would be cut away and the remaining ends coupled to the opposite end extensions 7 and 14.

Each of the radial ribs 13 has a shouldered portion 15 and the several shoulders cooperate with one another to form a locating and centering seat for the lowermost coil of the main valve seating spring 16 as seen in Figure 3, so that the spring is located wholly above the bottoms of the several drain troughs 12. The opposite end of the spring 16 bearing against the backing plate 17 is centered by downwardly struck tongues 18 fitted to the coils so that lateral displacement of the valve assembly is unlikely to occur. A gasket or disk 19 of Duprene or similar material is carried by the backing plate to engage the annular rib 20 pressed in the cover 9. To afford a tight seal the surface of the rib 20 engaged by the gasket should be worked smooth.

The gasket and backing plate are secured together by a hollow rivet or eyelet 21 extending through aligned openings in the center of the parts and the eyelet is closed by a gasket or ring 22 also formed of Duprene and which is mounted on the headed stud or pin 23 extending through the opening in the main valve. The gasket 22 is seated by a light spring 24 bearing on the underside of the backing plate 17 at one end and at its opposite end against a cupped retainer 25 carried by the lower end of the pin 23, the attachment being made by forming the end of the pin as a hollow rivet and peening it over the retainer. The side wall of the retainer is cut away at spaced intervals affording a series of projecting fingers 26 which bottom against the underside of the backing plate 17 to prevent the coils of the spring 24 closing together, thereby insuring free passage of fluid when the gasket 22 is unseated.

At its margin the backing plate 17 is provided with a dependent stiffening flange 27 which is spaced from the wall of the casing 8 to afford a free path for the escape of pressure fluid. It is desirable, however, to guard against excessive lateral displacement of the valve relative to its seat by arranging projecting portions of the backing plate at circumferentially spaced intervals to approach closely the circular wall of the casing 8. By way of example this is illustrated in Figure 4, where it will be seen that the backing plate is of an irregular outline relative to the casing 8 so that there are three projections or nose portions 28 spaced apart 120°. The lower edge of the peripheral flange 27 may be arranged to bottom on the ridges 13, as illustrated in Figure 5, to relieve the main spring 16 of excessive compression forces. In this fully opened position of the valve the coils of the main spring may be brought close together but this will not interfere with the discharge of pressure fluid, inasmuch as the depressed troughs 12 provide a by-pass around the compressed spring.

In the assembly of the parts after their formation the elements of the valve are first brought together and then introduced together with the spring 16 into the casing 8. Thereupon the cover 9 is brought into closing relation with the casing 8 and its rim spun over to effect the joint 10. The unit assembly thus formed may be readily applied to the customary overflow pipe whereupon the cooling system will be closed for pressure operation. To prevent bursting of the parts and leakage at the pump packings and hose connections the resistance of the main spring 16 is selected so that the valve will open at three or four pounds pressure. Thus the system operates normally under an internal pressure which increases the efficiency of the cooling system. Excess pressure is relieved and the discharged pressure fluid escapes from the overflow pipe 5 after passing through the valve unit. To prevent strain on the parts after the system cools down, in the event the contraction of the system contents causes an internal depression, the gasket 22 will open against the light spring 24 for the bleeding into the system of air until pressures are substantially equalized. As will be apparent, the location of the pressure valve in the overflow pipe will enable use of all the available height within the upper portion of the radiator shell to be occupied by the inlet tank so that maximum tank capacity is afforded.

I claim:

In a radiator overflow valve, a casing, a valve within the casing comprising a gasket and a backing plate therefor, a hollow rivet securing together the gasket and backing plate, a second gasket seating over and having a pin projecting through the hollow rivet, a coil spring to seat the last mentioned rivet and bearing at one end on said plate and a spring retainer carried by the pin to seat the opposite end of the spring and provided with plate engaging stops to limit compression of the spring and prevent closing of its coils.

NELSON WALKER.